United States Patent [19]

Hollis et al.

[11] Patent Number: 4,477,272
[45] Date of Patent: Oct. 16, 1984

[54] FAN FILTER

[76] Inventors: Craig E. Hollis, 3520 Cleveland Hghts. Blvd., 115, Lakeland, Fla. 33803; Glenn E. Hollis, 3621 Belcher Dr., Tampa, Fla. 33609

[21] Appl. No.: 395,679

[22] Filed: Jul. 6, 1982

[51] Int. Cl.$^3$ ............................................ B01D 46/10
[52] U.S. Cl. ........................................ 55/471; 55/491; 55/500; 55/509; 55/529
[58] Field of Search .................... 55/383, 385 R, 467, 55/471, 472, 491, 500, 505, 507, 509, 529

[56] References Cited

U.S. PATENT DOCUMENTS

| | | | |
|---|---|---|---|
| 1,438,868 | 12/1922 | Shull et al. | 55/505 |
| 1,750,446 | 3/1930 | Wallace et al. | 55/471 X |
| 1,967,713 | 7/1934 | Kelley | 55/467 |
| 2,096,262 | 10/1937 | Roth | 55/385 R X |
| 2,161,027 | 6/1939 | Dollinger | 55/471 UX |
| 2,304,309 | 12/1942 | Leathers | 55/509 X |
| 2,627,217 | 2/1953 | Hainke et al. | 55/467 X |
| 3,051,230 | 8/1962 | Hart | 55/507 X |

*Primary Examiner*—Kathleen J. Prunner

[57] ABSTRACT

A filter used in conjunction with a motor driven fan is mounted on the cage which covers the fan blades. The filter has a configuration similar to that of the cage and has a slot extending from its outer periphery to its central area to permit the filter to be slipped over the motor. Drawstrings are sewn into the filter about its outer periphery and are used to secure the filter to the cage. One end of each drawstring is rigidly connected to one of the corners of the slot and the other end of each drawstring has a hook which is hooked onto a bar of the cage to hold the drawstring taut. The cage and filter are disposed on the intake side of the fan so that the air is filtered before it impinges on the fan blades. This prevents the accumulation of dust and dirt on the fan.

3 Claims, 1 Drawing Figure

FAN FILTER

BACKGROUND OF THE INVENTION

1. Field of the Invention

This invention relates to filters. More particularly, this invention relates to air filters designed to be used in conjunction with fans.

2. Description of the Prior Art

Presently there exists many varieties of fans designed to circulate air within a room of a house or other location. The circulating air within the room increases the rate of evaporation of the perspiration from the people in the room. The heat of vaporization removed from the skin surface of the people in the room causes a cooling effect which is felt by the people. The people are therefore feel significantly cooler and comfortable even though the temperature and the humidity of the ambient air remains the same.

The use of fans to circulate air within a room has increased dramatically within the past several years due to the ever increasing cost of energy. That is, the energy cost of operating a fan is significantly less than that of an air conditioner or heat pump without, within certain limits, degrading the comfort of the living environment within the room. It is anticipated that the use of fans to circulate air will be ever increasing due to the energy economies involved.

Unfortunately, one disadvantage to use of a fan to circulate air within a room, is the fact that the circulating air disturbs dust which has settled on the furnishings of the room and spreads such dust throughout the air space within the room. The fan also contributes to the introduction of outside dust and dirt into the room, thereby enhancing the dust problem. Further, such dust and dirt tends to accumulate on the fan itself which, over a relatively short period of time, not only renders the fan less efficient in circulating the air, but also produces an unsightly, dirty fan. This problem is typically aggravated by the fact that most fans cannot be easily disassembled for cleaning.

Another significant disadvantage concerning the use of fans deals with the circulation of pollen and other generally allergic substances throughout the air space within the room. With respect to a person who is allergic to such pollen and such substances, it is usually the case that that person will not take advantage of the energy conserving nature of a fan, but rather always insist upon using the air conditioner or heat pump to achieve the same comfortable environment within the room.

Therefore, it is an object of this invention to provide a method which overcomes the aforementioned inadequacies of the prior art devices and provides an improvement which is significant improvement with the circulating fan art.

Another object of this invention is to provide a fan filter for preventing the accumulation of dust and dirt on the fan itself.

Another object of this invention is to provide a fan filter which substantially reduces the amount of dust circulated within the room in which the fan is being used to circulate the air.

Another object of this invention is to provide a fan filter which is quickly and easily removable from the fan to permit the fan filter to be readily cleaned or replaced.

Another object of this invention is to provide a fan filter which is economically manufactured and sold to the public.

The foregoing has outlined some of the more pertinent objects of the invention. These objects should be construed to be merely illustrative of some of the more prominent features and applications of the intended invention. Many other beneficial results can be attained by applying the disclosed invention in a different manner of modifying the invention with the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose summarizing the invention, the invention comprises a fan filter for filtering the air circulated by a fan. More particularly, the fan filter comprises a configuration substantially similar to the configuration of the fan such that the fan filter may be mounted about the cage encompassing the rotating fan blades. Preferably, the fan filter is located about that part of the cage which is located upstream of the moving air such that the air is filtered by the fan filter before it impinges upon the fan blades. In this manner, the dust suspended within the air is filtered before it is able to contaminate the cage and the fan blades. Further, the fan filter may be impregnated with a pharmaceutical product to reduce the allergic effects of pollen on persons effected thereby.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawing in which.

DETAILED DESCRIPTION OF THE PREFERRED EMBODIMENT

Figure 1:
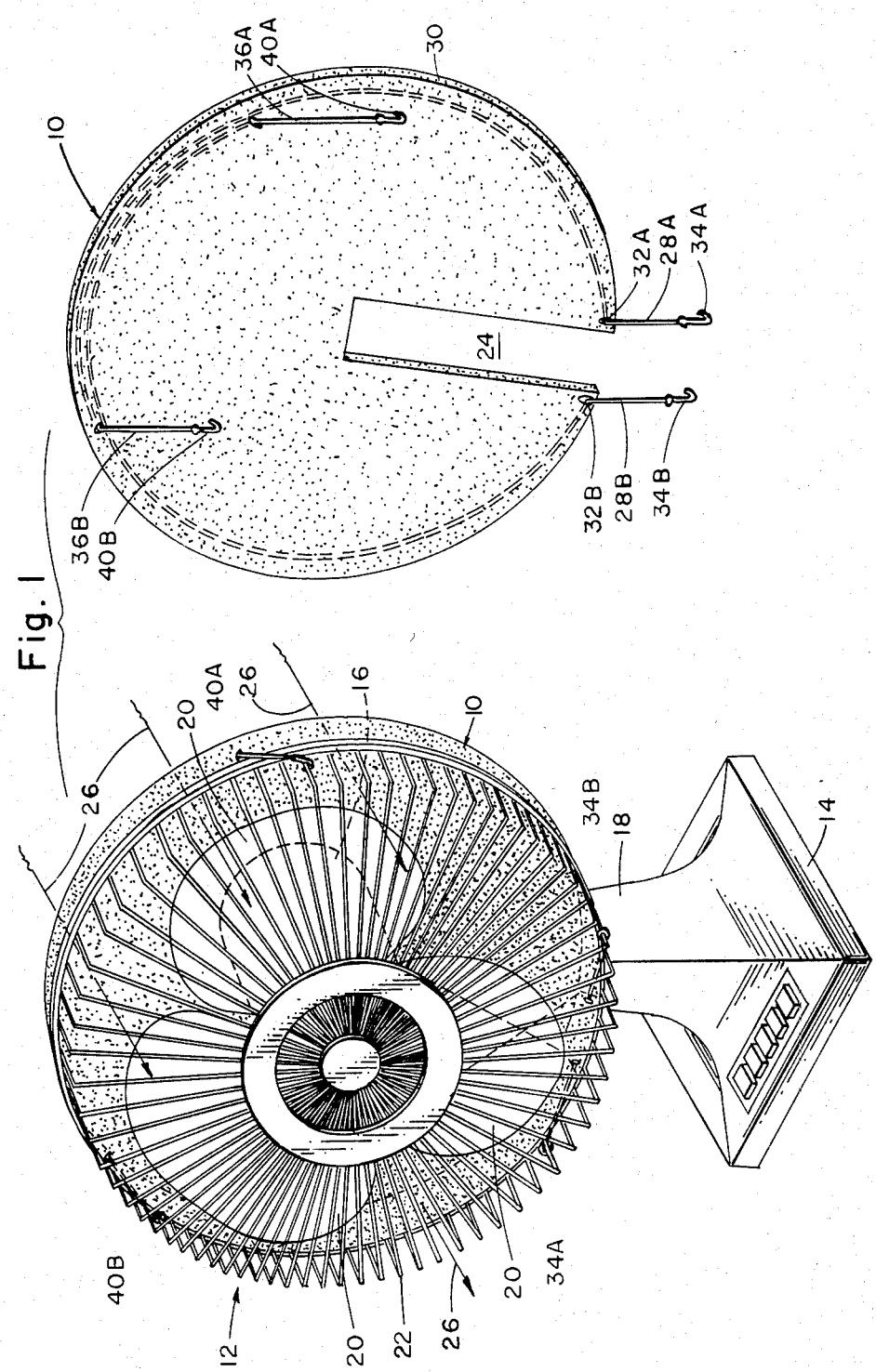
FIG. 1 is an exploded frontal view of the fan filter of the invention installed on and removed from a conventional household fan, with the bars of the rear portion of the cage being omitted for clarity.

FIG. 1 is an exploded isometric view of the fan filter 10 of the invention removed from and installed on a conventional household fan 12. Basically, a typical household fan comprises a base 14 and a motor housing 16 extending from the base 14 by means of a gooseneck stand member 18. A plurality of fan blades 20 are operatively connected to the drive shaft of the motor (not shown) contained within the motor housing 16. A protective cage 22 is disposed about the entire area of the fan blades 20 to prevent objects from inadvertently coming in contact with the rotating blades 20. It is noted that the above description of a conventional fan 12 is for illustrative purposes only, and it should be understood that the fan filter 10 of the present invention is not limited to any particular type of fan 12, whether such fan 12 is permanently mounted or a portable unit.

The fan filter 10 of the invention is manufactured from a filter material of sufficient porosity to permit a large volume of air to pass therethrough while retaining any dust particles, pollen, etc. which may be suspended within the mass of moving air. Preferably, however, the fan filter 10 comprises a relatively soft and pliable filter material which may be conveniently cleaned with water or similar cleaning agents to remove dust particles, pollen, etc. which have becomed trapped within the pores of the fan filter 10.

Referring to FIG. 1, it is seen that the fan filter 10 comprises a substantially circular configuration corresponding to the substantially circular configuration of the cage 22 of the fan 12. A slot 24 extends from the outer periphery of the fan filter 10 to the central area thereof. The slot 24 permits the fan filter 10 to be inserted about the cage 22 and about the drive mechanism of the fan 12 such that the fan filter 10 may be positioned upstream of the air flow, as represented by arrows 26. Of course, the slot 24 must be dimensioned to be sufficiently large such that the fan filter 10 may be slipped over the drive mechanism without significant binding of the filter material.

The fan filter 10 is securely fixed about the upstream (rearward) side of the cage 22 by means of a first and second drawstring 36A and 36B which are slidably sewn into the periphery 30 of the fan filter 10. Preferably, the drawstrings 36A and 36B extend about a portion of the periphery 30, with one end of the drawstrings originating from and rigidly connected to the lower corners 32A and 32B respectively, formed by the slot 24 and the other end extending from opposing sides of the upper periphery 30. Upon installation of the fan filter 10 about the upstream side of the cage 22, the ends of the drawstrings 36A and 36B may be tensioned to rigidly secure the fan filter 10 about the cage 22. The ends of the drawstrings 36A and 36B may include a hook 40A and 40B such that, upon tightening of the drawstrings, the hooks may be conveniently hooked onto one of the bars of the cage 22 to hold the drawstrings in a taut position. Of course, the drawstrings may be a stretchable, or a non-stretchable elongated member.

In the more preferred embodiment shown in FIG. 1, the ends 28A and 28B of the drawstrings 36A and 36B extend from the corners 32A and 32B and are fitted with a hook 34A and 34B. The lengths of the drawstrings are selected to permit the ends 28A and 28B thereof to criss-cross across the lower face of cage 22 when the fan filter 10 is fitted about the rear portion of the cage 22 such that the corners 32A and 32B overlap one another.

It is noted that two additional drawstrings (not shown) may be rigidly connected to the corners 32A and 32B of the fan filter 10 to substitute for the ends 29A and 28B of the drawstrings 36A and 36B which extend from the corners. If such was desirable, the drawstrings would also have to be rigidly connected to the corners. The above described arrangement would operate in substantially the same manner as the preferred embodiment illustrated in FIG. 1.

It should now be fully appreciated that the fan filter 10 of the invention may be conveniently removed from the cage 22 of the fan 12 for cleaning. It should also be appreciated that the removability of the fan filter 10 from the fan 12 permits the filter 10 to be impregnated with a pharmaceutical to reduce the circulation of pollen or other allergic substances within the air space in which the fan 12 is operating. The pharmaceutical impregnated fan filter 10 also functions to disperse the pharmaceutical throughout the air space in which th fan 12 is operating. In this manner, the atomized pharmaceutical suspended within the air further reduces other pollen or allergic substances which may be present in the air but which have not been drawn through the filter.

Although the fan filter 10 has been described in particular detail with respect to a circular cage 22, it shall be understood that the fan filter 10 may comprise a square or rectangular configuration to correspond to a cage having a square or rectangular configuration. Further, depending upon the cage member itself, it may be desirable to incorporate an annular plate about the periphery 30 of the fan filter 10 to afford the fan filter 10 more rigidity when installed about a less rigid cage.

Now that the invention has been described,
What is claimed is:

1. In a fan of the type having fan blades rotatively driven by a motor and a protective cage surrounding the fan blades, the improvement comprising:
    a sheet of filter material having a configuration similar to that of said cage and being mounted about said cage and motor on the intake side of said fan, said sheet having a slot extending from its outer periphery so as to permit said sheet to be inserted about said motor; and means for securing said sheet about the periphery of said cage, said securing means including a first drawstring disposed about a portion of the outer periphery of said sheet, a second drawstring disposed about at least another portion of the outer periphery of said sheet and a hook connected to the ends of each drawstring to permit said ends to be connected to a bar of said cage.

2. The fan as set forth in claim 1, wherein one end of said first drawstring is disposed adjacent one side of said slot at said outer periphery and one end of said second drawstring is disposed adjacent the other side of said slot at said outer periphery.

3. The fan as set forth in claim 2, wherein the sides of said slot are overlapped when said sheet is secured to said cage.

* * * * *